United States Patent [19]

Teter

[11] Patent Number: 4,774,974
[45] Date of Patent: Oct. 4, 1988

[54] SYSTEM FOR REMOVING ASBESTOS FROM STRUCTURES

[76] Inventor: Bruce W. Teter, 326 Forest Dr., Coeur d'Alene, Id. 83814

[21] Appl. No.: 897,641

[22] Filed: Aug. 18, 1986

Related U.S. Application Data

[63] Continuation-in-part of Ser. No. 720,875, Apr. 10, 1985, abandoned.

[51] Int. Cl.$^4$ ................................................ B08B 3/00
[52] U.S. Cl. .................................. 134/110; 134/22.1; 134/22.12; 134/24; 134/25.4; 134/21; 55/233; 55/234; 55/302
[58] Field of Search .......................... 55/233, 234, 302; 134/22.1, 22.12, 24, 25.4, 26, 39, 42, 110, 172, 177, 182; 241/189 R, 190, 99

[56] References Cited

U.S. PATENT DOCUMENTS

| | | | |
|---|---|---|---|
| 3,006,436 | 10/1958 | Starbuck et al. | 55/233 |
| 3,795,089 | 5/1974 | Reither | 55/233 |
| 4,093,126 | 6/1978 | Castiaux | 241/99 |
| 4,141,753 | 2/1979 | Creed | 134/24 |
| 4,437,867 | 3/1984 | Lerner | 55/233 |
| 4,626,291 | 12/1986 | Natale | 134/21 |

Primary Examiner—H. M. S. Sneed
Assistant Examiner—Sharon T. Cohen
Attorney, Agent, or Firm—Wells, St. John & Roberts

[57] ABSTRACT

A system and process for removing hazardous or toxic particulate materials from surfaces includes all components necessary for safe removal of the material in a van body that can be moved easily from one site to another. The system includes mechanism for sealing of selected areas, with tubing connecting the selected sealed areas to a separator chamber in the van body. Air pressure is lowered within the sealed enclosed area and airflow is maintained through the tube to the separator chamber. Fluidic carrier jets may also be directed within the tube toward the separator chamber. Particulate materials can be removed from the surface within the enclosure and deposited into the tube where it flows in an air and fluid carrier stream to the separator chamber. There, larger particulates are allowed to drop into a collection tank. Remaining particulate materials are filtered by a high efficiency particulate absolute filter until the air is safe to be discharged into the atmosphere. Airflow and pressure differential is produced by one or more of a series of valved fan units near a discharge end of the chamber. An auxiliary airflow tube and return air (make-up air) tube can also be connected between the chamber and enclosure.

12 Claims, 2 Drawing Sheets

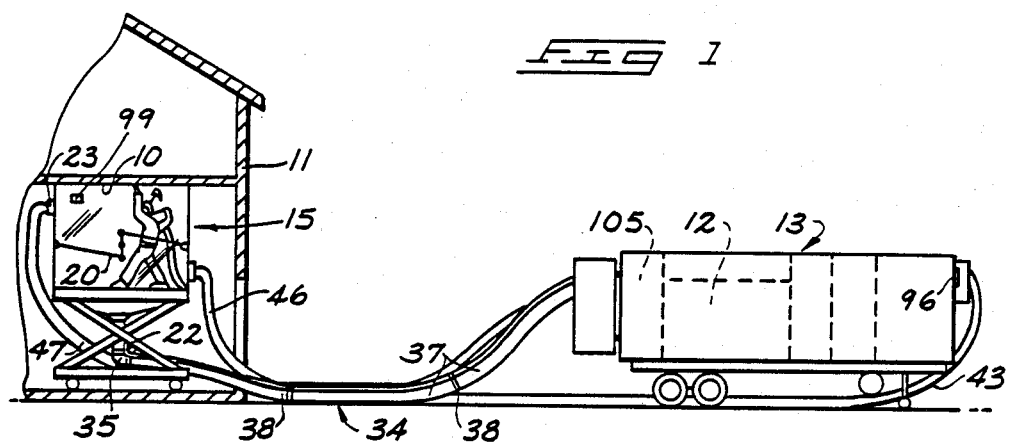
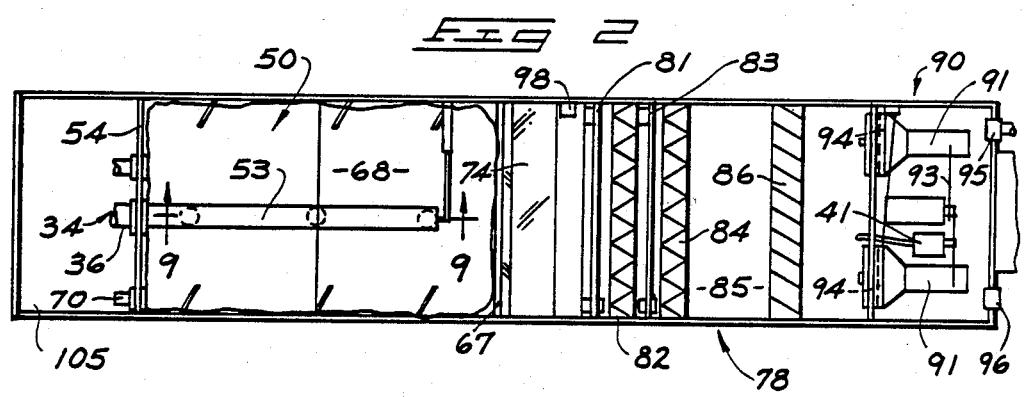
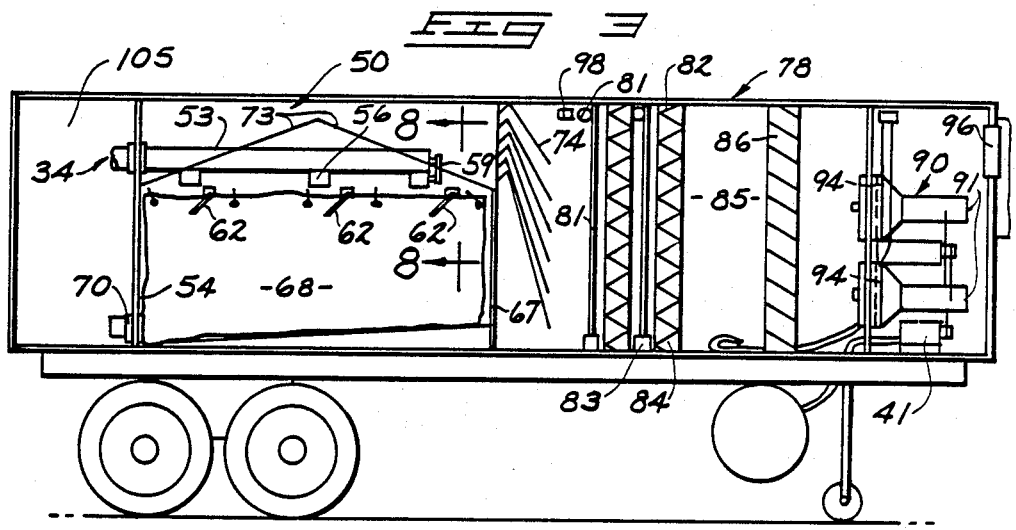

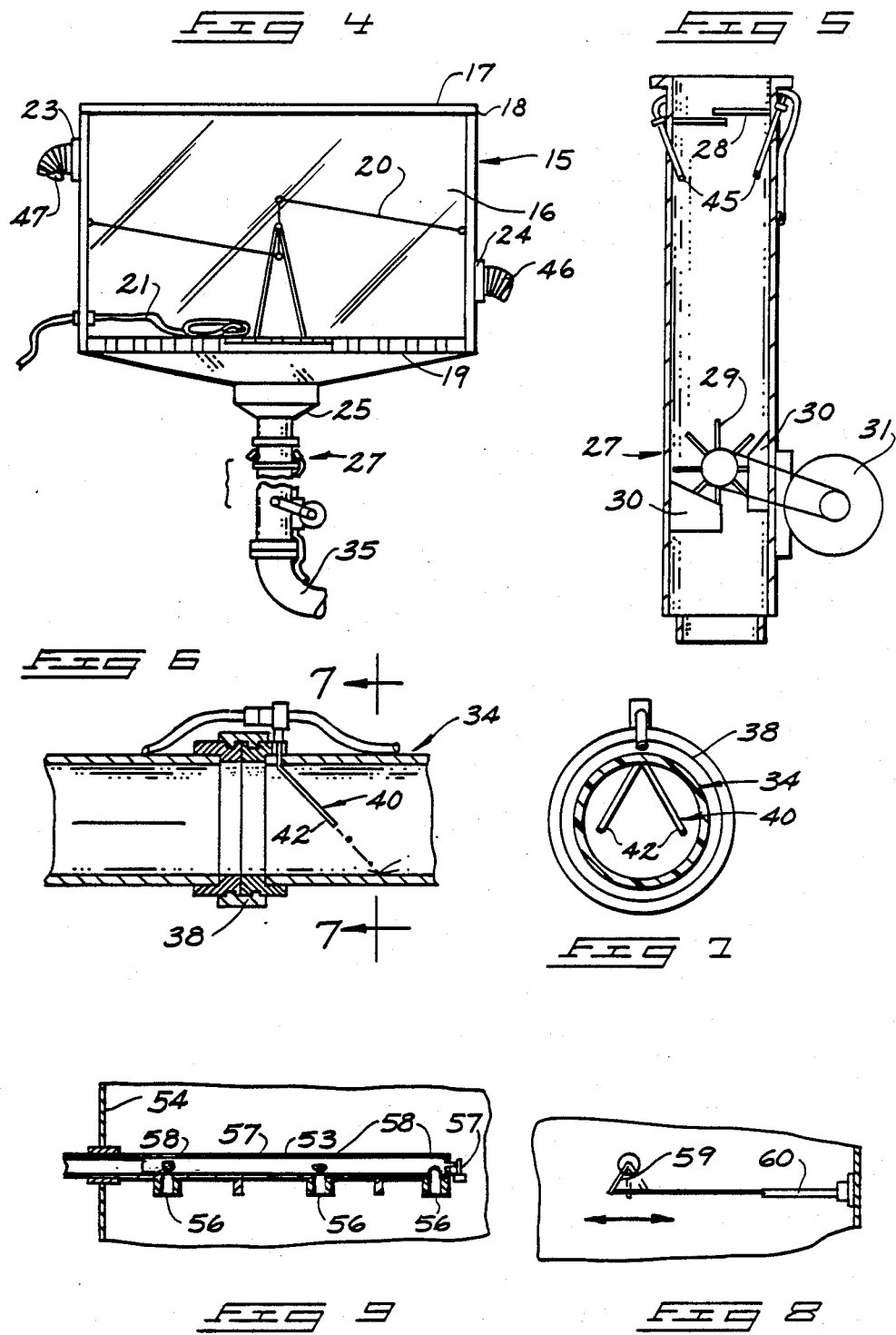

SYSTEM FOR REMOVING ASBESTOS FROM STRUCTURES

RELATED APPLICATIONS

This application is a continuation-in-part of U.S. patent application Ser. No. 720,875, filed Apr. 10, 1985, now abandond.

FIELD OF THE INVENTION

The present invention relates to safe removal of hazardous, toxic or nuisance particulate materials and other dispersible matter, organic or inorganic, or admixtures sorbed or adsorbed.

BACKGROUND OF THE INVENTION

Existing methods for removing hazardous or toxic materials involves very tedious and expensive procedures. For example, a room containing dangerous asbestos materials must be first sealed off. Workers wearing protective clothing then remove the materials within the sealed room, placing it within plastic bags. The bags are then moved to a disposal site.

This process is very slow and not without hazards. Even double lining for the bag containers will not prevent accidental breakage at which time the materials included therein may be released to the atmosphere. Furthermore, the room must be opened then resealed as workers enter and leave the area. Careful cleaning procedures must also be followed after the asbestos has been removed.

The need for removal of asbestos from structures is often foregone because the resources necessary to fund the appropriate conventional removal procedures are lacking. Many structures therefore remain with the asbestos problem or must be abandoned until sufficient funding and competent removal contractors can be obtained to correct difficulty.

Similar predicaments are experienced with other dangerous or nuisance materials where safe, yet efficient, removal is desired.

An urgent need therefore remains for removal equipment that will facilitate safe and complete removal of asbestos and other hazardous, toxic, or nuisance materials.

BRIEF DESCRIPTION OF THE DRAWINGS

A preferred form of the present invention is illustrated in the accompanying drawings in which:

FIG. 1 is a diagrammatic view illustrating placement of the present system in use;

FIG. 2 is an enlarged sectional plan view of a sealed chamber used in the present invention;

FIG. 3 is a sectioned elevation view of the elements shown in FIG. 2;

FIG. 4 is a detailed view of an enclosure that may be used with the present invention;

FIG. 5 is a sectioned view of a grinder mechanism;

FIG. 6 is a sectioned view through a portion of interconnected tubes of the present invention;

FIG. 7 is a sectioned view taken substantially along line 7—7 in FIG. 6;

FIG. 8 is a fragmented detail view taken substantially along line 8—8 in FIG. 3; and FIG. 9 is a view taken substantially along line 9—9 in FIG. 2.

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

For purposes of this disclosure, the term "materials" and "particulates" as used herein should be understood to mean any dispersible hazardous, toxic, or nuisance matter which can be organic or inorganic, or admixtures sorbed or adsorbed upon each other. By way of example only, the present description will deal primarily with removal of asbestos materials from surfaces, usually within structures. With the above definition, however, it should be well understood that the present process and system may be useful in the safe removal of many other forms of "particulates" or "materials." An exemplary list may include, but is not limited to: urea formaldehyde, insulation materials, dioxins, coal dust, arsenic, silicates, grain dust, wood dust, PCB's (polychlorinated biphenol), etc.

Given the above understanding, the process and system exemplified herein may be provided for the removal of such materials as generally indicated graphically at 10 in FIG. 1 from an existing surface 11. Asbestos, as an example of such material 10, requiring removal is typically found in structures where pipes, ducting, or ceiling insulation, etc. has been accomplished using material including asbestos fibers. Removal of the loose particulate materials becomes necessary to avoid serious potential health hazards. The present system affords economical and relatively quick removal of the materials in a safe and effective manner.

Material 10 removed from the surface 11 is delivered by an air collection system to a collection tank 12 within a portable wheel-supported van body 13. The body 13 can be selectively moved by truck or other towing vehicle from one site to another and to appropriate authorized disposal sites where the sealed collector tank 12 can be emptied.

An important aspect of the present system is an enclosure means shown generally in FIG. 1 and in more detail in FIG. 4. The enclosure means 15 is securable to the surface 11 for effectively enclosing an area about the particulate 10 to be removed. The form of the enclosure means 15 shown in FIGS. 1 and 4 may vary according to need. For example, the enclosure means may take the form of the room or structure shown in FIGS. 1 and 4. Alternatively, it may simply be an appropriate sealing arrangement (not shown) where the materials are to be removed from a surface area in or outside of a structure.

The enclosure means 15 exemplified in FIGS. 1 and 4 is defined by five flexible sides that may be foldable. One open side 17 is preferably open and securable to the structure. The top side, as shown in FIGS. 1 and 4, is provided with a rim 18 for substantially sealing the enclosure about the confined area. The open end 17 could also be situated along one of the remaining sides depending upon the location of the material being removed.

A bottom 19 of the enclosure may be provided with an appropriate grate or flooring to support workers therein. The side walls 15 are preferably formed of a flexible material that may be transparent or translucent and supported on an expandable frame 20. The entire enclosure can be supported on a standard scaffold or lift mechanism 22.

The enclosure shown may be effectively used to substantially seal an area for removal of materials from overhead areas, floors or walls, such as, but not limited to, piping, air conditioning ducts, ceiling tiles and boiler lines.

Provision may be made for receiving a fluid such as water from an outside supply 21 through one of the flexible walls of the enclosure means when desired. For example, the outside fluid source may be used to supply water within the enclosure to wet asbestos materials. The water may be mixed with a saturant and sprayed onto the material before removal. The wetted asbestos may then be removed from the structure within the perimeter of the enclosure.

Danger of particulates escaping the enclosure is minimized by maintaining a negative pressure within the enclosure means. That is to say, the air pressure within the enclosure will be maintained lower than the ambient pressure surrounding the enclosure. Any air seepage will therefore be in an inward direction into the enclosure. Air will not be allowed to seep out into the surrounding area. Any unsettled, airborne particulates will therefore remain within the enclosed area. This pressure differential is maintained by apparatus that will be described in greater detail below.

The enclosure means may be provided with several fittings for connection to tubes leading to the portable wheel-supported van 13. A fitting 23, for example, is provided for mounting a return air duct that supplies fresh air or recycled air in a closed circuit with the present system to the enclosure means. A fitting 24 is also provided for an auxiliary air tube used for drawing air and particulates to the van. Another provision may be made in the form of a funnel 25 formed along the floor or enclosure bottom 19. The funnel is upwardly open to receive materials removed from the structure within the perimeter of the enclosure means 15.

For solid materials, the funnel 25 may lead to a grinder means 27 that is shown in FIGS. 4 and 5. The grinder means 27 may be attached to the funnel 25 for receiving materials and for grinding them into small, easily moved particulates.

The grinder means may include a hollow tubular structure with a rubber splashback door 28 at an upward end thereof. This upward end is attachable and sealable to the funnel 25 for receiving the removed materials. The rubber splashback door will allow relatively free passage of the material as it is dropped into the grinder but will prevent the particulates from being thrown back upwardly by the grinding mechanisms below.

The removed particulates may be ground or comminuted between a bladed rotor 29 and rigid stators 30 mounted within the tubular support. A drive motor 31 is supplied outside the grinder tube for driving the rotor 29. It has been found that a 1.5 hp. motor rotating the grinder at approximately 3,600 rpm will function adequately to comminute any received materials to particle sizes easily transported in the closed system to the waiting van.

The rotors operate with a hammer-mill effect to comminute the material and discharge the resulting particles downwardly to a hollow tube 34 extending from an intake end 35 to a discharge end 36 connected to the van 13. The rotors will also produce an auxiliary airflow due to the rotating blades into the tube 34, assisting the airflow produced via the air collection system described below.

As an alternative, the grinder means 27 may provide a somewhat reduced scale from that shown in FIGS. 4 and 5 of the drawings to facilitate handheld use. Such an arrangement might be coupled with the larger grinder mechanisms shown, or could be used alone and directly connected to the hollow tube 34 by an appropriate flexible tube (not shown). Common vacuum heads can be used, branching into tube 34, depending on the nature of materials to be removed. Such branch lines may be used with or without the grinder means, and with or without the enclosure as exemplified above. When the heads are used alone, the "enclosure" then becomes incorporated in the individual vacuum heads.

The intake end 35 of tube 34 may be selectively secured in a sealed relationship to the grinder means 27 by an appropriate cam lock coupler (not shown) that is commonly available for producing moisture and airtight seals between hollow tubes.

The tube 34 is made up of several interconnected sections 37 having sealable fittings 38 at opposed ends. Similar conventional cam lock coupler scan be provided for securely sealing these sections together and to prevent seepage of air and entrained materials therefrom.

It is intended that air and moist or dry particulates be drawn or moved in a flowing manner along the tube to the van. This is accomplished by air movement and may be assisted by jet means 40 along the tube 34. The jet means 40 is supplied with a fluidic carrier under a selected pressure (approximately 90-3,000 psi) from a pump 41 on the van. The fluid carrier is pumped to jet nozzles 42 (FIG. 7) that may be situated at each of the sealable fittings 38 along the length of the tube. A common fluid line will supply each of the jet nozzles 42. The fluid line may be supplied in lengths equal to the tube lengths and attached along the sections to be joined as the tube sections are joined togehter. Quick disconnect couplings can be provided to interconnect the various water delivery tube sections together along the full length of the tube.

The jet nozzles 42 are shown in FIGS. 6 and 7. They are preferably angled in the direction of flow of air and particulates. The fluid discharged by the nozzles will contact the transported particles in the moving air within the tube. With asbestos, the preferred fluid is water, which serves to maintain the particulates in a somewhat wetted condition when required. The jets are oriented in the direction of flow to encourage flow of the particles along the tube to the van. The jets can further aid in avoiding plugging situations that might otherwise develop at the tube joints.

Fluid may also be supplied from the pump 41 to opposed nozzles 45 situated at the top end of the grinder means 27. The fluid here is also utilized to further contact the materials received from within the enclosure. Asbestos, when dropped into the grinder, will preferably include approximately 15 to 25% water by volume due to previous wetting. Water jets in the grinder may serve to further saturate the received materials and to provide a spray of water droplets that will contact and attach a good portion of any particulates dislodged by the grinding process.

In addition to tube 34, two other tubes may be supplied interconnecting the van and the enclosure means 15. An auxiliary air tube 46 may be supplied. This tube 46 leads from the van to an end connected to the fitting 24 described above. Tube 46 is used to maintain a low pressure environment within the enclosed area by supplementing air flow through the tube 34 or substituting for such flow should the tube 34 become clogged or otherwise incapable of drawing air from the enclosed area to the van. A make-up or return air tube 47 is also supplied between the van and enclosure area 15. Tube 47 is used to supply air to the enclosed area.

The contents of the wheel supported van 13 are shown in somewhat schematic form by FIGS. 2 and 3. Basically, the interior of the van body may be described as a separator chamber 50 in which collected particulates are received and separated from the air stream flowing through the tube 34 and auxiliary tube 46 from the removal area. The air is cleaned of particulates and is recycled through the make-up air tube 47 or is simply discharged into the surrounding atmosphere. Appropriate submicronic air filtration (described below) is provided within the separator chamber to adequately fitler the received air and render it safe for free discharge to the atmosphere.

A valved tube may extend within the separator chamber, from a sealed bulkhead 54 over the collection tank 12. The valved tube is elongated and may include three longitudinally spaced discharge spouts that may be selectively openable to direct airflow and collected particles into the collection tank 12 below.

A rotatable internal tube 57 may be provided within the valved tube 53. The internal tube 57 includes three angularly spaced holes 58. These holes are equiangularly spaced at approximately 30° from one another. The tube 57 may be connected to a crank 59 extending from the outward tube 53.

An operator 60 such as a cylinder or motor arrangement may be mounted between the crank 59 and van walls. The operator can be selectively actuated to rotate the internal tube 57, bringing any selected one of the holes 58 into alignment with an associated discharge spout 56. Appropriate sensors may be positioned within the tank to detect the level of material collecting below each of the tubes. As the collected material reaches a prescribed level, the appropriate sensor 62 may be activated. A signal may then be sent to the operator which will automatically rotate the internal tube to align another of the remaining two holes with its associated discharge spout. The discharging material and air will therefore be directed through the new opening until the collected material level builds to the height of the associated sensor.

The accumulating material will activate the sensor upon reaching a selected height at which time the operator will again be activated to rotate the internal pipe for a third time. This will bring the remaining hole into position, thereby changing the discharge location for the air and entrained asbestos particles. Material build-up will then continue below the last discharge opening until the final sensor is activated. The sesor may be connected to an appropriate warning device that will indicate the tank 12 is full and requires emptying.

The collection tank 12 is formed within the separator chamber 50 between the sealed bulkhead 54 and an upright partition wall 67. An upper edge of the wall may be spaced below the ceiling or top of the separator chamber to provide a space through which air may flow. The wall 67, along with the bulkhead 54 and side walls of the van, form the upwardly open collection tank 12 which can be lined with a flexible removable liner 68. The tank facilitates removal of collected materials in bulk slurry form through a sealable valve such as a gate valve 70.

Collected particulates will settle by gravity into the collection tank 12. The received air will move on through the separator chamber to be cleaned and discharged into the atmosphere or returned in a cleaned condition to the enclosure means 15 or removal site. The air received from the tubes 34 and 46 may be moved through a pre-filter arrangement 73 that will collect large particulates. It may then be encountered by a series of laminar flow baffles 74 which serve to spread the air stream over the entire face surface of downstream filter assemblies.

The airflow may be received from the laminar flow baffles by a filter assembly 78. The assembly 78 has the function of removing any remaining unsettled particulates and has the further function of drying the air for discharge when required.

The assembly 78 may include a progression of filter elements for this purpose. For example, a first wet prefilter element 81 may use water to wash particulates and water droplets containing particulates into a receiving tray below. The air may pass through this filter to a secondary, dry filter 82. Filter 82 serves to remove more particulates. A second wet filter 83 may also be employed adjacent the dry filter 82 to perform a further filtering function, along with a second dry filter 84.

The above filtering arrangement may be repeated as many times as necessary to clean the air of large fibers and water droplets before it enters a stabilizing air space 85 situated between the last dry filter 84 and a final submicronic filter 86. The filters comprising this wall are preferably made up of a high efficiency particulate absolute filter material capable of filtering approximately 14,000 cubic feet of air per minute and removing particulate matter of 0.03 microns and larger. Air exiting the high efficiency filter will be sufficiently free of particulates to meet or exceed any known safety regulation.

Airflow and pressure differential is produced within the separator chamber 50 and through the various tubes to the enclosed area by operation of an air displacement means generally shown at 90 within a forward end of the ban body. The air displacement means 90 may be comprised of a single fan or a battery of four fans 91 powered by a single drive source. In practice, a 125 hp. internal combustion engine has been used connected by appropriate belting 93 to drive shafts of the four fans 91. Each fan is preferably controlled by an independently operable valve arrangememt 94 (such as a standard Vortex valve). Appropriate controls can be provided to activate the valves according to selected pressure requirements and the nature of material being removed from the structure.

A discharge 95 may feed return air from the van to the removal area by the return air tube 47. An appropriate connection can be made at discharge 95 to releasably secure an end of the return air 47. Return or discharge air can be controlled by the appropriate control valves 94 or by an internal valve (not shown) within the air tube 47 to dictate the amuont of air returned to the removal site or the enclosure means 15. Only enough air should be returned to the enclosure means 15 through the tube 47 to partially make up for the air drawn into the tube 34 and auxiliary tube 46. The remainder of the make-up air should come from the area immediately adjacent to the removal site or the enclosure means 15 to assure any potential air leaks will occur in an inward direction and will not allow escape of airborne particulates.

The remaining discharge 96 simply opens to the atmosphere and will allow escape of the remaining discharge air that is not recycled back to the removal site through tube 47.

Appropriate controls can be utilized for maintaining low pressure within the enclosure means 15 and separator chamber 50. Appropriate sensors 98, 99, for example, may be situated within the chamber and enclosure respectively to constantly monitor the pressure in both areas. An abrupt change in pressure differential between the two areas will indicate a difficulty.

For example, a sudden drop in pressure within the separator chamber may indicate a stoppage along the tube 34. Action can then be taken responsibe to the pressure differential to alleviate the problem. The fan control valves 94 may then be opened to enlist the help of additional air flow to further lower the pressure within the separator chamber, producing a suction that will normally pull any blockage through the tube 34 and into the collection tank. The added air flow 91 will also serve to maintain the low pressure area within the enclosure means 25 through the auxiliary air tube 46. Valving within the make-up or replacement air tube 47 can also be used in appropriate situations to decrease the amount of air returning to the enclosed area, thereby further assuring that the low pressure area will be maintained while the blockage is being removed.

Various other forms of sensors and controls may be supplied that are well within the capabilities of control system designers.

The present process may be best understood in conjunction with an explanation of the operation for the present system. Firstly, however, it should be understood that the entire system may be enclosed within the portable van. All the tubes and the enclosure structure 15 can be carried within a storage space 105 at the rear of the van, behind the bulkhead 54. Doors (not shown) can be sealed at this area and secured for transport of the entire system to a work site.

In the example for asbestos removal, the van is first positioned at an area adjacent to the structure where the storage space 105 can be opened and the tubes and exclosure means can be removed and assembled. An area can then be enclosed about the site where asbestos is to be removed simply by positioning the enclosure means 15 such that the open end 17 is situated about the area against an appropriate surface. If another form of the enclosure means is to be utilized, the process remains similar. The enclosure may also become an actual room within the structure and the enclosure means 15 may simply be a sealing device for securing the tubes to a doorway or window.

After the area has been properly enclosed, and the tubes 34 assembled and connected to the separator chamber, the fans can be driven to produce a pressure differential within the enclosed area. This pressure differential is created about the asbestos to be removed so that air pressure within the enclosed area is lower than that of the surrounding ambient pressure. Any seepage will be directed into rather than out of the enclosed area. Any flying particulates or fibers will therefore be maintained within the enclosed area and there will be no danger of fibers escaping the enclosure even though a small "leak" may exist.

When the pressure differential has been established, action can be initiated for removal of the asbestos. This can be accomplished by a worker within the assembled enclosure 15. It is advisable first to wet the asbestos with water and a saturant material such as polyethylene glycol. Enough water is applied to the asbestos to saturate the material to a water content of between 15 and 25%. This reduces the amount of flyable particulates that will be freed when the asbestos is removed from the adjacent structure.

The next step after wetting the asbestos is to remove it from the structure. This can be done using standard and/or power tools since the area is secured by the enclosure means 15. The removed asbestos is then placed through the funnel where it is drawn through the tube 34 in an air stream to the collection tank 12 within the van. The same air movement that is used to produce the pressure differential is also used to move the wetted asbestos material along the tube and into the separator chamber 50. The asbestos particles arriving at the separator chamber 50 are allowed to drop into the storage tank 12 from the incoming air. The air is then filtered within the chamber 50 to remove asbestos particles and the cleaned air is subsequently exhausted. Exhausted air may be returned to the atomsphere or a portion of the air can be returned to the enclosed area by the return air tube 47.

The above process may be augmented by grinding the asbestos received through the enclosure just as it enters the tube. The ground or comminuted asbestos particles will move freely along the length of the tube when ground into fine particulates.

Flow along the tube may be encouraged by injecting water under relatively high pressure (approximately 90 psi or higher) at stations along the length of the tube. This is accomplished by the water jet means 40 as described above. The jets serve to increase the flow of asbestos particles along the tube to the separator chamber and to wet the flying asbestos particles as they move along. This facilitates movement through the tube and encourages separation by gravity as the air and entrained droplets with attached particulates enter the chamber over the collection tank 12. The heavy water droplets and solid asbestos particulates will drop into the collecting tank 12.

The process may also be enhanced by producing an auxiliary airflow from the enclosed area to the separator chamber 50. The auxiliary tube 46 can be used to draw air from the enclosed area to the storage tank, supplementing the air movement through the tube 34.

The process continues by filtering air within the separator chamber to clear the air by removing flyable asbestos particles. This step may be accomplished by passing the air received within the chamber through the filter assemblies described above.

Asbestos can be continually removed within the enclosed area until all traces are drawn through the tube 34 and received within the sealed separator chamber 50.

The entire area can be washed down with water before the system is shut down to facilitate movement of the enclosure to another area. Relocation of the enclosure within the same structure can be accomplished simply by moving the support 22 and subsequently reattaching the enclosure means to the structure about a new source of asbestos to be removed. The above process is then repeated until all the harmful material has been removed from the structure.

When all asbestos has been removed the enclosure means can simply be appropriately folded and the tubes disconnected and gathered into the truck where it can be stored and transported to the next site.

The present process will leave the structure clean and free of harmful asbestos particles while the operation remains safe to the workers accomplishing the asbestos removal. It is stimated the cost and completion time will be significantly reduced using the present system and process in comparison to the existing systems in current use.

Asbestos materials is used as an example but the system and process can be used on any number of hazardous, toxic or nuisance materials by adjusting the airflow rate and filter media. For example, for use in removing PCB's (polychlorinated biphenol), activated charcoal filters may be used along with the submicronic high efficiency particulate absolute filter. Also, in PCB removal, the jet means would be utilized to deliver a fluid other than water to assist motion of the material along the tube, and a removable stainless steel collector tank would preferably be used in place of the flexible liner 68.

In compliance with the statute, the invention has been described in language more or less specific as the structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A system for safely removing hazardous or toxic materials from a surface, comprising:
    portable enclosure means securable to the surface for partially sealing an area about the material to be removed;
    an intake tube for receiving materials removed from the surface, including an intake end, opening into the enclosure means and a discharge end;
    a portable sealed separator chamber having an intake connectable to the discharge end of the intake tube and a chamber discharge;
    a collection tank enclosed within the portable sealed separator chamber adjacent the intake tube discharge end;
    a submicronic air filter assembly within the chamber between the collection tank and chamber discharge for filtering materials from air within the chamber prior to discharge from the separator chamber through the chamber discharge;
    air displacement means between the filter assembly and chamber discharge for reducing air pressure within the area sealed by the portable enclosure means and producing an intake airflow through the intake tube to carry removed materials from the portable enclosure means into the chamber to the collection tank, through the filters and subsequently forcibly discharge the filtered air out through the chamber discharge; and
    return air tube means for cycling at least a portion of the filtered air forcibly discharged through the chamber discharge to the portable enclosure means to provide make-up air to the area sealed by the portable enclosure means for recycling through the intake tube, said return air tube means leading from the chamber discharge to the portable enclosure means.

2. The removal system of claim 1 further comprising laminar air flow baffles within the chamber between the collection tank and submicronic filter assembly.

3. The removal system of claim 2 further comprising:
    a first filter element adjacent the laminar flow baffles; and
    wherein the submicronic filter is a high efficiency particulate absolute filter and is positioned between the first filter and the air displacement means.

4. The removal system of claim 3 wherein the high efficiency particulate absolute filter is capable of removing particulates of 0.03 microns and larger for air passing therethrough.

5. The removal system of claim 1 further comprising jet means along the intake tube for directing jets of fluid into the intake tube in the direction of airflow to urge flow of materials within the intake tube toward the separator chamber.

6. The removal system of claim 5 wherein the intake tube is made up of several sections releasably joined at sealable joints and wherein the jet means includes a discharge nozzle within the intake tube at each sealable joint.

7. The removal system of claim 6 further comprising pump means on the chamber for supplying fluid at a pressure within the range of approximately 90–3000 psi to the jet means.

8. The removal system of claim 5 further comprising pump means for supplying fluid at a pressure within the range of approximately 90–3000 psi to the jet means.

9. The removal system of claim 1 wherein the air displacement means is comprised of:
    a fan;
    drive means for selectively operating the fan and an individual, controllable valve on the fan.

10. The removal system of claim 1 further comprising:
    grinder means in the intake tube adjacent the tube intake end.

11. The removal system of claim 1 wherein the collection tank includes a removable waterproof liner and a sealable drain for receiving water and material from the intake tube.

12. The removal system of claim 1 further comprising an elongated valved tube within the separator chamber above the collection tank having longitudinally spaced discharge openings; and
    means for selectively opening any one of the spaced openings to discharge air and material into the collection tank below.

* * * * *